United States Patent

Wahler

[11] Patent Number: 5,882,125
[45] Date of Patent: Mar. 16, 1999

[54] CYLINDRICAL ROLLER BEARING ASSEMBLY WITH COMB CAGE

[75] Inventor: Michael Wahler, Sennfeld, Germany

[73] Assignee: SKF GmbH, Germany

[21] Appl. No.: 968,055

[22] Filed: Nov. 10, 1997

[30] Foreign Application Priority Data

Nov. 9, 1996 [DE] Germany ............ 296 19 498 U

[51] Int. Cl.⁶ ............................................. F16C 33/49
[52] U.S. Cl. ............................................... 384/572
[58] Field of Search ......................... 384/572, 576, 384/580, 523

[56] References Cited

U.S. PATENT DOCUMENTS

| | | | |
|---|---|---|---|
| 4,391,476 | 7/1983 | Negele et al. | 384/572 X |
| 4,812,058 | 3/1989 | Hofmann et al. | 384/572 X |
| 5,044,788 | 9/1991 | Murphy et al. | 384/572 X |
| 5,352,047 | 10/1994 | Ingall et al. | 384/572 |

FOREIGN PATENT DOCUMENTS

| | | | |
|---|---|---|---|
| 1078381 | 3/1960 | Germany | 384/572 |
| 2 137 978 | 7/1971 | Germany. | |

*Primary Examiner*—Thomas R. Hannon
*Attorney, Agent, or Firm*—Eugene E. Renz, Jr.

[57] ABSTRACT

In a cylindrical roller bearing assembly with flanges on the outer ring and a comb cage comprising a side ring and separating webs projecting axially from the side ring and which engage axially between the rollers, some of the webs having tabs, which project radially outwardly and engage behind the side surface of one of the flanges of the outer ring, characterized in that at least two tabs are distributed around the circumference and in that two insertion openings with a cross-sectional profile corresponding to that of the tabs are provided on the other flange for the coaxial insertion of the comb cage in the outer roller.

2 Claims, 4 Drawing Sheets

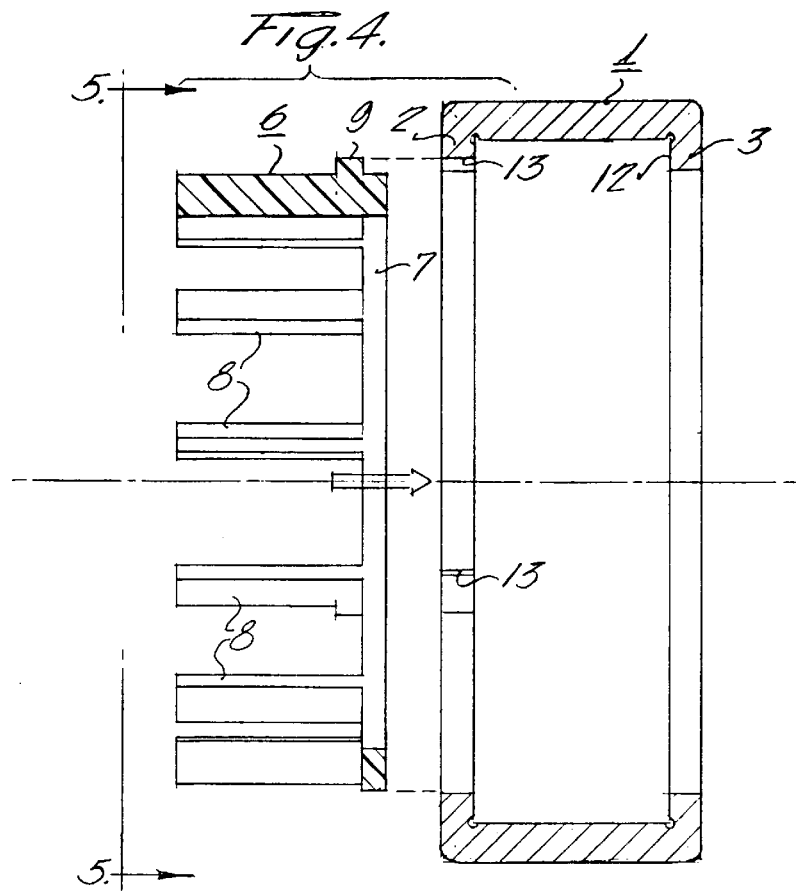
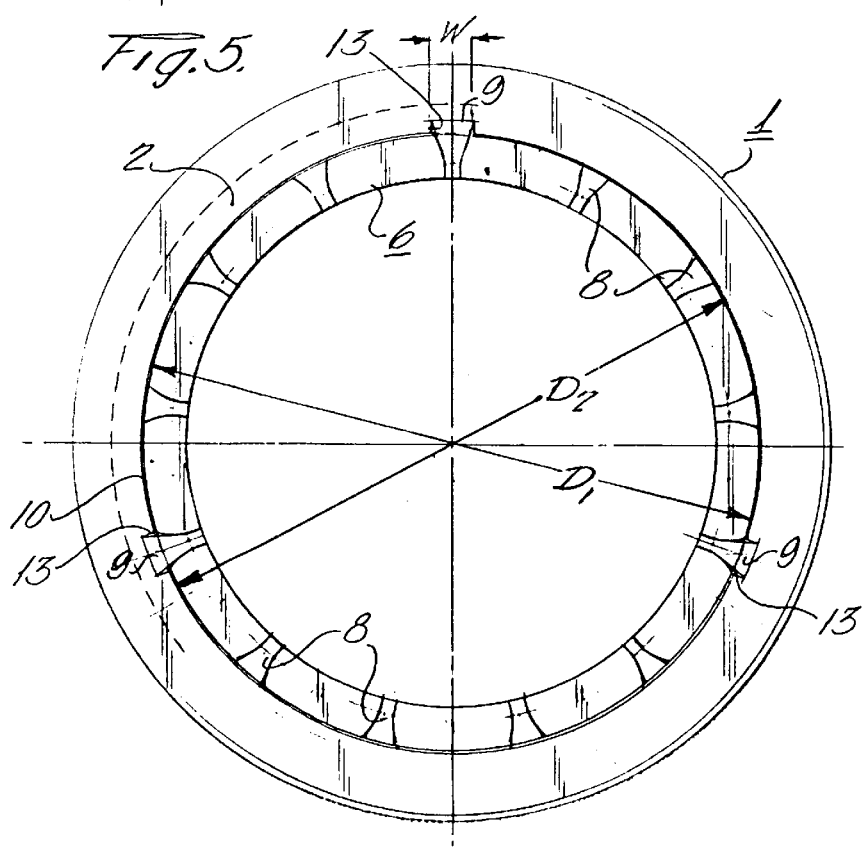

5,882,125

CYLINDRICAL ROLLER BEARING ASSEMBLY WITH COMB CAGE

FIELD OF THE INVENTION

The present invention relates to improvements in cylindrical roller bearing assemblies and particularly to cylindrical roller bearing assemblies with comb cages.

BACKGROUND OF THE INVENTION

Cylindrical roller bearing assemblies with comb-type cages are not new per se. German Patent DE 2,137,978 shows a cylindrical roller bearing assembly wherein the flange of the outer ring is provided with two diametrically opposed insertion openings. The openings are sized so that the cage can be inserted by rotating it 90° whereupon it is then rotated back into its operating system. It is noted that in these assemblies, the insertion openings must be made very large. Furthermore, the separating webs are limited to a certain length to allow for the rotation and insertion of the cage. Furthermore, it has been observed that it is also necessary for the external radial contour of the separating webs to conform to the shape of the raceway so that it will not be obstructed by the raceway in their rotated position.

SUMMARY OF THE INVENTION

With the foregoing in mind, it is an object of the present invention to provide an improved cylindrical roller bearing characterized by novel features of construction and arrangement facilitating a comb cage which can be quickly and easily inserted into the outer ring of the bearing assembly and functions to support and guide the rollers in the manner described in more detail hereafter.

To this end, in accordance with the present invention, the cage has at least two radially projecting tabs spaced apart a predetermined distance around the circumference of the cage and an outer ring flange is provided with at least two complementary insertion openings complementing the spacing of the tabs and of a cross-sectional profile complementing the profile of the tabs. This arrangement allows for coaxial insertion of the comb cage into the outer ring.

The diameter of the lateral surface of the cage is slightly smaller than the bore diameter of the outer ring flange so that the cage can be easily inserted. Insertion openings in the bore of the outer ring flange with a conforming cross-section are provided at appropriate points on the flange to accommodate the tabs projecting out from the cage in the radial direction. In this manner, the tabs and therefore the entire cage can be inserted coaxially into the outer ring. Accordingly, as soon as the cage is inserted it is in an operating position wherein the tabs can rest against the inner side surface of the other outer ring flange. It is noted that the length of the separating webs and their particular shape, do not interfere with the insertion assembly process. Thus, in terms of construction, a functionally oriented unit, which allows almost complete freedom of design is provided.

BRIEF DESCRIPTION OF THE DRAWINGS

These and other objects of the present invention and various features and details of the operation and construction thereof are hereinafter more fully set forth with reference to the accompanying drawings, wherein:

FIG. 4 is an exploded sectional view showing the comb cage positioned prior to insertion within the outer ring;

FIG. 5 is a side elevational view taken on the line 5, 5 of FIG. 4 showing the indexing of the tabs on the comb cage with the slots in the flange of the outer ring prior to insertion of the comb cage within the outer ring.

DETAILED DESCRIPTION OF THE PREFERRED EMBODIMENT

Figure 1:
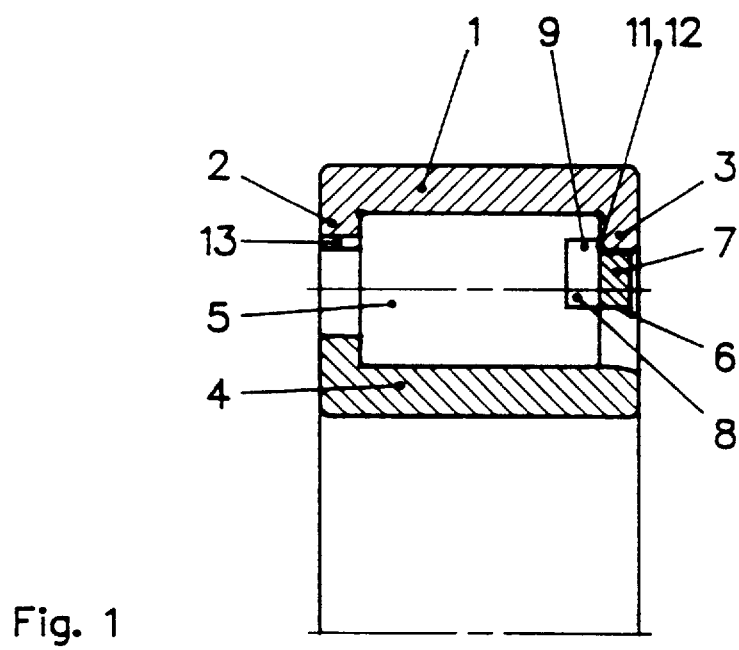
FIG. 1 is a partial longitudinal cross section through a cylindrical roller bearing assembly with a comb cage in accordance with the present invention.
Figure 2:
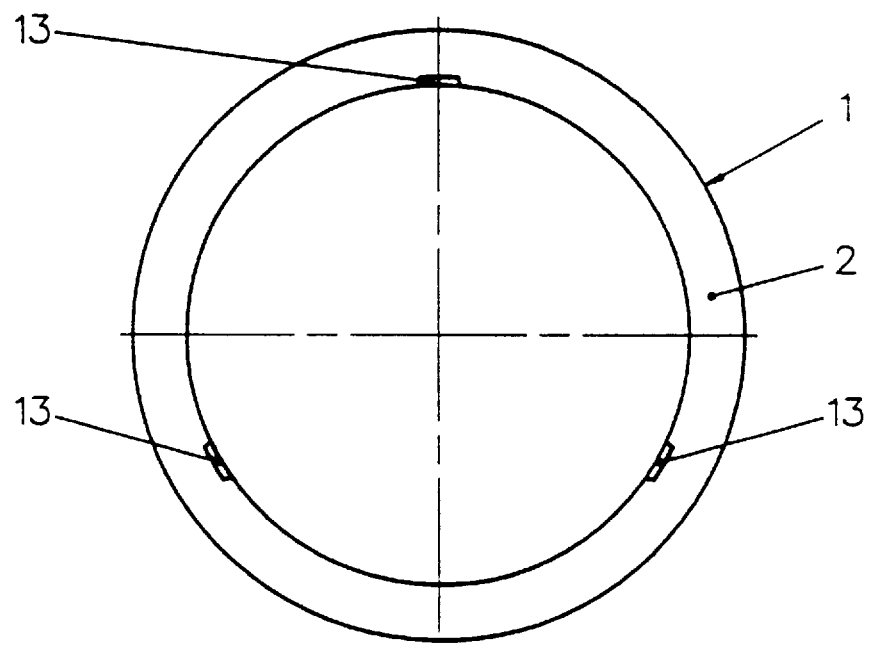
FIG. 2 is a side elevational view of the outer ring shown in FIG. 1.

Referring now to the drawings and particularly FIG. 1 thereof, there is shown a cylindrical roller bearing assembly comprising an annular outer ring (1) have a pair of radially inwardly directed, circumferentially extending flanges at opposite axial ends of the outer ring (2). The assembly further includes an inner ring (4) having in the present instance only one radially, outwardly directed circumferentially extending flange (4a) at one axial end thereof, a plurality of cylindrical rollers engaging between the confronting inner and outer raceways (R$i$) and (R$o$) and a comb cage (6) which separates and circumferentially spaces the rollers relative to one another.

Figure 3:
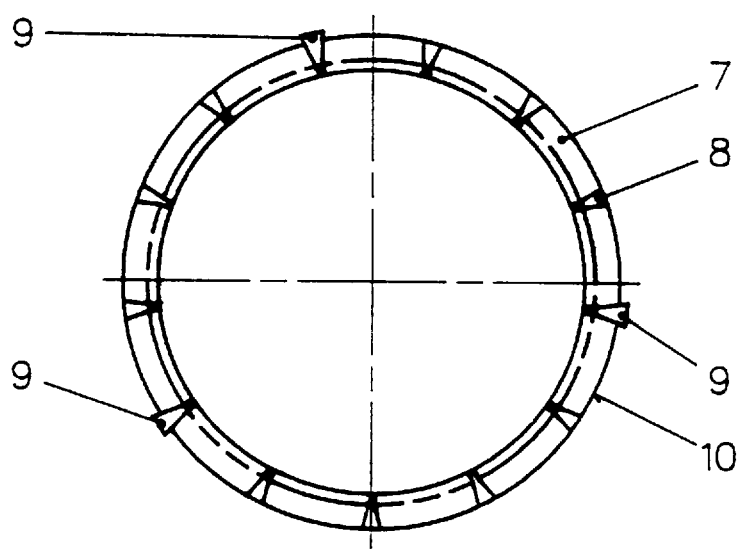
FIG. 3 shows a side view of the comb cage of FIG. 1.

Referring now to FIG. 3, comb cage (6) has a side ring (7) which in the assembled relation is aligned with the outer ring flange (3) of the outer ring (1). The cage has a plurality of circumferentially equi-spaced separating webs (8) which extend axially from the side ring (7) and in the assembled bearing are disposed between the cylindrical rollers (5) to space the same circumferentially relative to one another. As best shown in FIG. 3, the cage further includes, in the present instance three circumferentially spaced tabs (9) which, as illustrated, project out beyond the lateral surface (10) of the comb cage (6). The projection (11) of the tabs (9) beyond the lateral surface (10) confronts the inner side surface (12) of the flange (3) and thus positions the cage (6) in the axial operating position shown in FIG. 1. Tabs (9) form radial extensions of the separating webs (8) and are of a width (W) which is generally the same width as the separating webs (8).

Insertion openings (13) are provided in the bore (2a) of the flange (2) as shown on the left in FIG. 1. These openings (13) have a complementary cross-sectional profile as the tabs (9). As illustrated, the bore diameter (D2) of the outer ring is slightly greater than the outer diameter (D1) of the comb cage. The openings (13) are circumferentially spaced to match the circumferential spacing of the tabs (9) for ease of assembly when the tabs (9) register with the openings (13). In the illustrated embodiment, the tabs (9) and openings (13) are spaced to define an isosceles triangle rather than an equilateral triangle due to bearing proportions (see FIG. 5). Accordingly, the comb cage can thus be inserted through flange (2) on the left in FIG. 1 and brought up against the flange (3) on the right. This is the first step in the assembly process and thereafter the cylindrical roller (6) are inserted and the inner ring (4) is installed.

Even though a particular embodiment of the invention has been illustrated and described herein, it is not intended to limit the invention and changes and modifications may be made therein within the scope of the following claims.

what is claimed is:

1. In a cylindrical roller bearing assembly with flanges on the outer ring and a comb cage comprising a side ring and separating webs projecting axially from the side ring and which engage axially between the rollers, some of the webs having tabs, which project radially outwardly and engage behind the side surface of one of the flanges of the outer ring, characterized in that at least two tabs are distributed around the circumference and in that two insertion openings with a cross-sectional profile corresponding to that of the tabs are provided on the other flange for the coaxial insertion of the comb cage in the outer roller.

2. A cylindrical roller bearings assembly with a comb cage according to claim 1, characterized in the circumferential direction, the tabs have essentially the same width as the separating webs.

* * * * *